United States Patent [19]

Thoma

[11] Patent Number: 4,623,874

[45] Date of Patent: Nov. 18, 1986

[54] WORD LENGTH CONVERTER

[75] Inventor: Donald E. Thoma, Mt. Prospect, Ill.

[73] Assignee: GTE Communication Systems Corp., Northlake, Ill.

[21] Appl. No.: 667,662

[22] Filed: Nov. 2, 1984

[51] Int. Cl.$^4$ ............................................. H03K 13/02
[52] U.S. Cl. .............................. 340/347 DD; 358/261
[58] Field of Search ................ 340/347 DD; 358/260, 358/261

[56] References Cited

U.S. PATENT DOCUMENTS

| | | | |
|---|---|---|---|
| 4,135,214 | 1/1979 | Weber | 340/347 DD |
| 4,276,544 | 6/1981 | Iinuma | 340/347 DD |
| 4,382,249 | 5/1983 | Jacobsthal | 340/347 DD |

*Primary Examiner*—William M. Shoop, Jr.
*Assistant Examiner*—Sharon D. Logan
*Attorney, Agent, or Firm*—Robert J. Black

[57] ABSTRACT

A bidirectional word length converter for use in transferring data between a first data processing unit and second data processing unit each using a word format of a different length. The converter includes a buffer connected between the first and second units and a converter control. The converter control is adapted to accept a plurality of mode signals from the first unit to control the transfer of data in a first length word format from the first unit to the second unit in a second length word format. The converter control is further adapted to accept an alternative plurality of mode signals to transfer data from the second unit to the first unit in a similar manner.

20 Claims, 1 Drawing Figure

U.S. Patent     Nov. 18, 1986     4,623,874
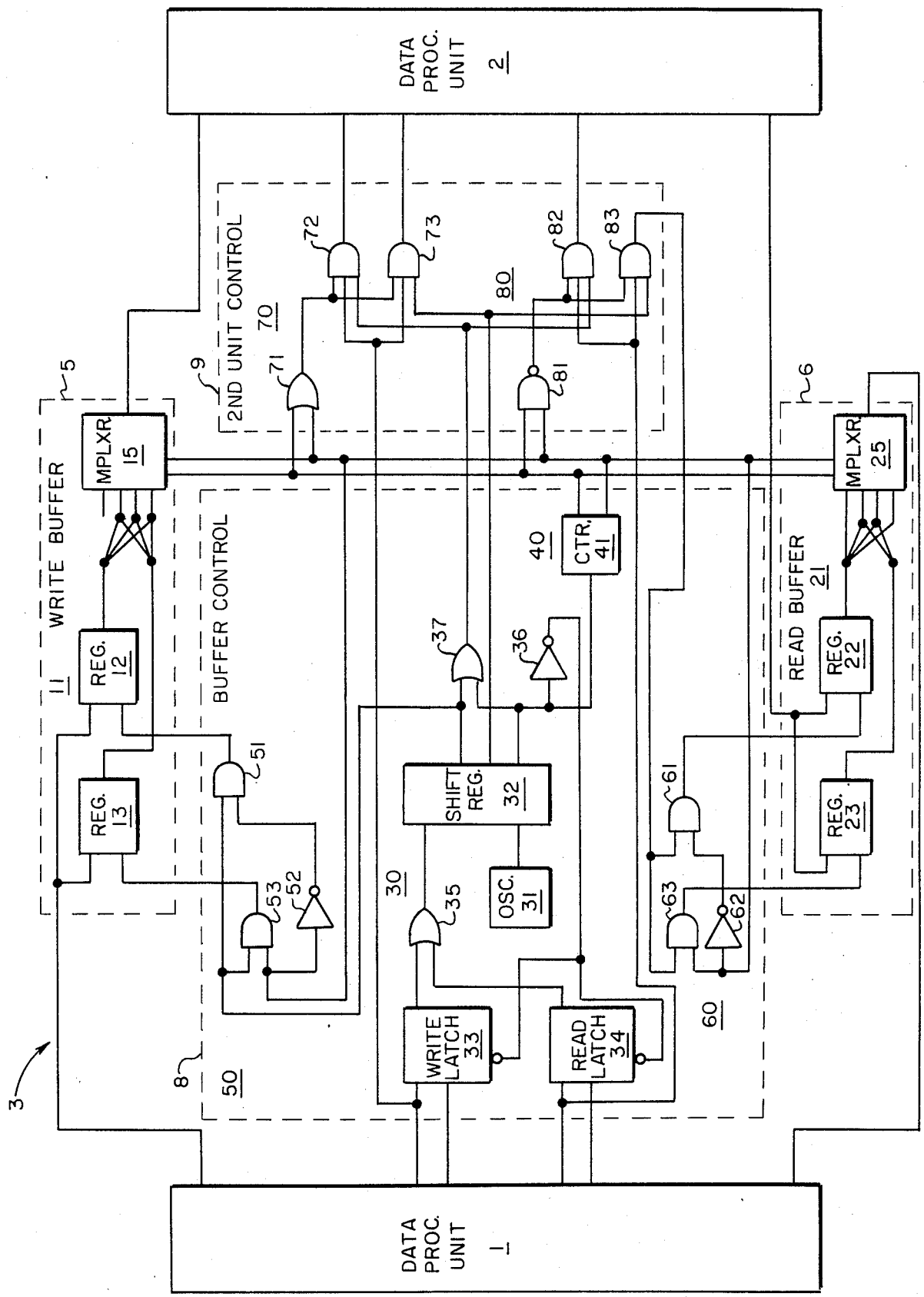

WORD LENGTH CONVERTER

BACKGROUND OF THE INVENTION (1) Field of the Invention

The present invention relates to word length converters and, more particularly to a word length converter employed between a first and a second data processing unit each utilizing a different word length.

(2) Background Art

Work length converters are very well known to those skilled in the art. In this regard word converters are known which transfer data from a unit using a given word format to a second unit using a larger word format. Such converters transfer a received smaller word in the format of a larger word filling in high-order bits with blank data. Such an arrangement while operating generally satisfactorily requires the second unit to store and process nonmeaningful blank information.

Other arrangements are known which transmit data words serially between units one bit at a time. In this regard, transfers both to the unit using the larger word format and to the unit using the smaller word format reception processing of each bit of information separately and additional processing to format the received data bits into data words. Such an arrangement, while operating generally satisfactorily, requires the expenditure of large amounts of data processing capability to effect the transfer of data.

Accordingly, it is the object of the present invention to provide a new and useful word length converter that provides reformatted data to the second unit without resorting to the use of blank filler data or large amounts of data processing capability as found in previously utilized designs.

BRIEF SUMMARY OF THE INVENTION

The present invention overcomes the above cited problems by providing a bidirectional word length converter for use in transferring data between a first data processing unit utilizing a word format of a first length and a second data processing unit uitlizing a word format of a second length. The converter includes a buffer connected between the first and the second units and a converter control.

The converter control includes a buffer control connected between the first unit and the buffer. The buffer control, in response to receipt of a plurality of mode signals from the first unit, generates a plurality of first control signals to operate the buffer to accept data in the first length word format from the frist unit and transmit the data in the second length word format to the second unit.

The converter also includes a second unit control connected between the buffer control and the second unit. The second unit control is operated in response to receipt of a plurality of second control signals from the buffer control to extend a plurality of command signals to the second unit to operate the second unit to accept data in the second length word format.

In the alternative, the buffer control in response to the receipt of a plurality of alternative mode signals from the first unit, generates an alternative plurality of second control signals to the second unit control which is operated in response to receipt of the above alternative plurality of second control signals from the buffer control to extend an alternative plurality of command signals to the second unit to operate the second unit to transmit data in the second length word format to the buffer and to extend a plurality of third control signals to the buffer control.

The buffer control is further operated in the alternative in response to receipt of the plurality of alternative mode signals from the first unit and the plurality of third control signals from the second unit control, to generate an alternative plurality of first control signals to operate the buffer to accept data in the second length word format from the second unit and transmit the data in the first length word format to the first unit.

The present invention additionally may in alternative embodiments be adapted to transmit data only from the first unit to the second unit or adapted to transmit data only from the second unit to the first unit.

BRIEF DESCRIPTION OF THE DRAWING

The single sheet of drawings comprises a schematic diagram of a word length converter employing the operational principles of the present invention.

DETAILED DESCRIPTION OF THE INVENTION

Referring now to the figure there is shown a first data processing unit 1, a second data processing unit 2 and a word length converter 3 in accordance with the present invention connected therebetween. The word length converter 3 includes a write buffer 5, a read buffer 6 and a converter control including a buffer control 8 and a second unit control 9. The write buffer 5 and the read buffer 6 are connected between the first unit 1 and the second unit 2. The buffere control 8 is connected to the first unit 1, to the write buffer 5, and to the read buffer 6. The second unit control 9 is connected between the buffer control 8 and the second unit 2.

The write buffer 5 includes a write register 11 including a first portion 12 and a second portion 13, and a write multiplexer 15. The first portion 12 and the second portion 13 of the write register 11 each include a plurality of inputs connected to the first unit 1, a plurality of outputs and a store lead. The write multiplexer 15 includes a plurality of outputs connected to the second unit 2 and a plurality of input groups, each input group including a plurality of inputs connected to predetermined ones of the write register outputs. Similarly, the read buffer 6 includes a read register 21 including a first portion 22 and a second portion 23, and a read multiplexer 25.

The first portion 22 and the second portion 23 of the read register 21 each include a plurality of inputs connected to the second unit 2, a plurality of outputs and a store lead. The read multiplexer 25 includes a plurality of outputs connected to the first unit and a plurality of input groups, each input group including a plurality of inputs connected to predetermined ones of the read register 21.

The buffer control 8 includes a timing sequence generator 30, a multiplexer control 40, a write register control 50 and a read register control 60. The timing sequence generator 30 includes an oscillator 31, a four bit shift register 32, a write cycle latch 33 a read cycle latch 34 an OR gate 35, an inverter 36 and an OR gate 37. The shift register 32, includes a shift clock input connected to an output of the OR gate 35 and four outputs. The first output of the shift register 32 is unconnected, the second output is connected to a first input of the OR gate 37, and the fourth output is connected to a second input of the OR gate 37 and an input of the inverter 36. The write cycle latch 33 and the read cycle latch 34 each include a mode signal data input, a stobe signal clock input, a latch reset input and a latch output. The mode signal data inputs and the strobe signal clock inputs of the write cycle latch 33 and the read cycle latch 34 are connected to the first unit 1, the latch reset inputs are connected to an output of the inverter 36, and the outputs are connected to a first input and a second input of the OR gate 35 respectively.

The multiplexer control 40 includes a two bit binary counter 41 including a clock input and a first and a second output. The clock input of the two bit binary counter 41 is connected to the fourth output of the shift register 32.

The write register control 50 includes an AND gate 51 and inverter 52 and an AND gate 53. The AND gate 51 includes an output connected to the store input of the first portion 12 of the write register 11, and the AND gate 33 includes an output connected to the store input of the second portion 13 of the write register 11. The AND gates 51 and 52 each include a first input connected to the second output of the shift register 32. The first output of the two bit binary counter 41 is connected to a second input of the AND gate 53 and an input of the inverter 52.

The read register control 60 includes an AND gate 61 and inverter 62 and an AND gate 63. The AND gate 61 includes an output connected to a store input of the first portion 22 of the read register 21 and the AND gate 63 includes an output connected to the store input of the second portion 23 of the read register 21. The AND gate 61 and the AND gate 63 each include a first input, the first inputs connected together. The inverter 62 includes an output connected to a second input of the AND gate 61 and an input connected to a second input of the AND gate 63 and the first output of the two bit binary counter 41.

The second unit control 9 includes a write control 70 and a read control 80. The write control 70 includes an "OR" gate 71, an AND gate 72 and an AND gate 73. The AND gate 71 includes a first and a second input each connected to corresponding outputs of the two bit binary counter 41 and an output connected to a first input of the AND gates 72 and 73. The AND gates 72 and 73 each include a second input connected to the mode signal data input of the write cycle latch 33 and an output connected to the second unit 2. The AND gate 72 includes a third input connected to the output of the OR gate 37, and the AND gate 73 includes a third input connected to the third output of the shift register 32.

The read control 80 includes a NAND gate 81, an AND gate 82 and an AND gate 83. The AND gate 81 includes a first and a second input connected to corresponding outputs of the two bit binary counter 41 and an output connected to a first input of the AND gate 82 and the AND gate 33. The AND gates 82 and 83 each include a second input connected to the mode signal data input of the read cycle latch 34.

The AND gate 82 includes a third input connected to the output of the OR gate 37 and an output connected to the second unit 2. The AND gate 83 includes a third input connected to the third output of the shift register 32 and an output connected to the first inputs of the read register control AND gates 61 and 63.

The timing sequence generator 30 is operated in accordance with the present invention by receipt of mode signals from the first unit 1. In this regard, receipt of a write request signal coincident with a write strobe signal on the data and clock inputs respectively, of the write cycle latch 33 will set the write cycle latch 33. Alternately, receipt of a read request signal coincident with a read strobe signal on the data and clock inputs respectively of the read cycle latch 34 will set the read cycle latch 34. The write cycle latch 33 or the read cycle latch 34 will act with the OR gate 35, the shift register 32, the oscillator 31, and the inverter 36 as a "Johnson" counter. The "Johnson" counter in cooperation with the OR gate 37 will generate a first, a second, a third and a fourth timing signal. The second timing signal and the third timing signal will commence at the same time followed by commencement of the fourth timing signal and followed later yet by commencement of the first timing signal. The second timing signal will then cease followed by the fourth timing signal ceasing and lastly the first and third timing signals will cease simultaneously thus completing one cycle of the timing sequence generator.

The multiplexer control 40 is operated by receipt of a series of a first timing signal to generate on its outputs a two bit binary address, the control 40 initially outputing an address of "zero" followed in sequence by the addresses "one", "two", "three" and the address "zero" again. The addresses "zero", "one", "two", and "three" comprise gating signals for the write multiplexer 15 and the read multiplexer 25. The write register control 50 is operated in response to receipt of the first timing signal coincident with an address of "zero" or "two" from the multiplexer control 40 to generate a store signal to the first portion 12 of the write register 11. The write register control 50 is further responsive to the second timing signal coincident with an address of "one" or "three" from the multiplexer control 40 to generate a store signal to the second portion 13 of the write register 11.

The write control 70 is responsive to the third timing signal coincident with the write signal from the first unit and an address of "one", "two", or "three" from the multiplex control 40 to generate a write request signal to the second unit 2. The write control 70 is further responsive to a fourth timing signal coincident with the write signal from the first unit 1 and an address of "one", "two", or "three" from the multiplexer control 40 to generate a write request strobe signal to the second unit 2. The write request signal and the write request strobe comprise a write command signal sent to the second unit 2.

The read control 80 is responsive to a read signal coincident with the third timing signal and an address of "zero", "one", or "two" from the multiplex control 40 to generate a read request signal to the second unit 2. The read control 80 is further responsive to the fourth timing signal from the timing sequence generator 30 coincident with the read signal from the first unit 1 and an address of "zero", "one", or "two" from the multiplex control 40 to generate a read request strobe signal to the read register control 60. The read request signal comprises a read command signal sent to the second unit 2 and the read command signal and write command signal comprise command signals sent to the second unit 2. Further, the timing signals, the multiplexer gating signals, the write signal, and the read signal comprise second control signals. Finally, the read request strobe signal comprises the third control signal.

The read register control 60 is operated in response to a read request strobe signal from the read control 80 coincident with an address of "zero" or "two" from the multiplex control 40 to generate a store signal to the first portion 22 of the read register 21. The read register control 60 is further operated in response to the read request strobe signal from the read control 80 coincident with an address of "one" or "three" from the multiplex control 40 to generate a store signal to the second portion 23 of the read register 21.

Write multiplex 15 and the read multiplex 25 are both responsive to adresses of "zero", "one", "two", and "three" from the multiplex control 40 to gate the zero grouping, first grouping, second grouping, and third grouping of inputs to their respective outputs. The write register first and second portion store signals together with the multiplexer gating signals comprise write control signals, the read register first and second portion store signals together with the multiplexer gating signals comprise read control signals, and the write and read control signals comprise first control signals.

The word length converter of the present invention may be operated to transmit a series of words in the first length word format from the first unit 1 to the second unit 2 in the second length word format in groups of four words. In this regard, the multiplex control will initially output an address "zero" to the write multiplex 15 thereby gating its zero input group to the second unit 2. The first unit 1 will start transmitting a group of words by transmitting the write signal to the timing sequence generator 30 and the write control 70. Simultaneously, the first unit 1 will transmit a first data word to a write register 11 and a write strobe signal to the timing sequence generator 30. The timing sequence generator 30 will generate the second timing signal which, when received by the write register control 50 coincident with the address "zero" from the multiplex control 40 will generate a store signal to the first portion 12 of the write register 11 thereby storing the data word presented by the first unit 1 therein. At this time the presence of the address "zero" from the multiplexer control 40 on the inputs of the gate 71 of the write control will prevent any signals from being generated and extended to the second unit 2. Upon occurrence of the first timing signal from the timing sequence generator 30 on the input to the multiplexer control 40, the multiplexer control 40 will increment its address to the address "one".

The first unit 1 will then extend a second data word to the write register 11 and a second strobe signal to the timing sequence generator 30; this while maintaining the write signal to both the timing sequence generator 30 and the write control 70. The timing sequence generator 30 will again generate timing pulses and the write register control 50, upon receipt of the second timing signal from the timing sequence generator 30 coincident with the address "one" from the multiplexer control 40, will generate a store signal to the second portion 13 of the write register 11 to store the extended data word therein. Upon occurrence of the third timing signal the write control will extend a write request signal to the second unit instructing it to prepare to receive the first converted data word. Upon the occurrence of the fourth timing signal from the timing sequence generator 30 the write control will generate a write strobe signal to the second unit 2 instructing the second unit 2 to accept the first converted data word consisting of the data in the first portion 12 and the first third of the second portion 13 of the write register 11. Upon the occurrence of the first timing signal the multiplexer control 40 will increment its address to the address "two" thereby disabling the first multiplexer input group and gating the second multiplexer input group to the second unit in preparation for the next converted data word to be tranmitted.

The first unit 1 will then extend a third data word to the write register 11 and a third strobe signal to the timing sequence generator 30, this with the write signal extended as above. The write register control 50 upon receipt of the second timing signal coincident with the address "two" from the multiplexer control 40 will generate a store signal to the first portion 12 of the write register to store the extended data word therein. Upon the occurrence of the third and fourth timing signals the write control 70 will extend first a request signal then a strobe signal to the second unit instructing the second unit to accept a second converted data word consisting of the second two-thirds of the second portion of the write register plus the first two-thirds of the first portion of the write register. Upon the occurrence of the first timing signal, the multiplexer control will increment its address to "three".

The first unit 1 will then extend a fourth data word to the write register 11 and a fourth strobe signal to the timing sequence generator 30 as above. The write register control 15 will upon the occurrence of the second timing signal and the adress "three" from the multiplex control 40 generate a store signal to the second portion 13 of the write register 11 to store the extended data word therein. Upon the occurrence of the third and fourth timing signals, the write control 70 will extend a request and a strobe signal to the second unit 2 to instruct it to receive the third converted data word consisting of the last third of the second portion of the write register and the entire first portion of the write register. Upon the occurrence of the first timing signal the multiplexer control will increment its address to "zero" thus completing transmission of four words from the first unit in a first length word format to the second unit as three words of a second length word format. Additional words may be transmitted in groups of four in the manner described.

The word length converter of the present invention may be operated to receive a group of three data words in a second length word format as four data words in a first length word format. In this regard, the first unit 1 will extend a read signal to the timing sequence generator 30 and the read control 80 followed by and coincident with a read strobe signal to the timing sequence generator 30. The timing sequence generator 30 will generate timing signals as described above and the read control 80 upon receipt of an initial address of "zero" from the multiplexer control 40 coincident with the third timing signal and the read mode signal from the first unit 1 will generate a read request to the second unit 2 whereupon the second unit 2 will present a first data word in the second length word format to the read register 21. Upon the occurrence of the fourth timing signal coincident with the address "zero" from the multiplexer control 40 and the read mode signal from the first unit 1, the read control 80 will extend a strobe signal to the read register control 60. The read register control 60 will, upon receipt of the read register store signal coincident with the address "zero" from the multiplexer control 40, will extend a store signal to the first portion 22 of the read register 21 to store the first data word therein. Upon the occurrence of the first timing signal the multiplexer control 40 will increment its address to the address "one" and extend that address to the read multiplexer 25 gating the first input group consisting of the first three-quarters of the first portion of the read register to the first unit 1. The first unit 1 will then read the first converted data word.

The first unit 1 will then request a second and a third converted data word and read the same as described above. The second converted data word will consist of the last quarter of the first portion of the read register together with the first half of the second portion of the read register, while the third converted data word will consist of the last half of the second portion of the read register together with the first quarter of the first portion of the read register. Following the reading of the third data word the multiplexer control will output the address "three".

The first unit 1 will then extend a fourth read strobe signal to the timing sequence generator 30 to request a fourth converted data word as described above and again the timing sequence generator 30 will generate the above mentioned timing signals. The read control 80 upon detection of the address "three" from the multiplexer control 40 via the gate 81 will be prevented from generating a read request to the second unit and a strobe signal to the read register control 60. The multiplexer control 40 upon occurrence of the first timing signal will extend the address "zero" to the read multiplex 25 gating the fourth converted data word consisting of the last three-quarters of the first portion of the read register 21 to the first unit 1 thus completing a read sequence of four data words. Additional data words may be read in a like manner in groups of four.

While but a single embodiment of the present invention has been disclosed, it will be obvious to those skilled in the art that numerous modifications may be made without departing from the spirit of the invention which shall be limited only by the scope of the claims appended hereto.

What is claimed is:

1. A word length converter for use in transferring data originating in a word format of first length from a first data processing unit to a second data processing unit utilizing a word format of a second length, said converter including,
    a buffer means connected between said first and said second units, and including,
        a write register including a plurality of inputs connected to said first unit, and
    a converter control, said converter control comprising:
    a buffer control connected between said first unit and said buffer means and including,
        a write register control connected between said first unit and said write register, said buffer control in response to receipt of a plurality of mode signals from said first unit, generating a plurality of first control signals to operate said buffer means to transmit said data in said second length word format to said second unit, and said write register control operated in response to said mode signals from said first unit to extend a plurality of store signals to said write register, said write register operated in response to said store signals to store data from said first unit; and
    a write control connected between said buffer control and said second unit, said write control operated in response to receipt of a plurality of second control signals from said buffer control to extend a plurality of command signals to said second unit to operate said second unit to accept said data in said second length word format.

2. A converter, as claimed in claim 1 wherein: said buffer means includes a write register including plurality of outputs and a write mulitplex including a plurality of input groups, each group connected to a predetermined different portion of said register outputs, said multiplex further including a plurality of outputs connected to said second unit, and said buffer control includes a multiplex control connected between said write multiplex and said first unit, said multiplex control operated in response to said mode signals from said first unit to extend a predetermined sequence of gating signals to said multiplex, and said multiplex responsive to said gating signals to gate a corresponding input group to said second unit.

3. A converter, as claimed in claim 1 wherein: said buffer control includes a timing sequence generator connected to said first unit, to said buffer means, and to said write control, said timing sequence generator operated in response to said mode signals from said first unit to extend a predetermined sequence of timing signals for use at said buffer means and to said write control.

4. A converter, as claimed in claim 3 wherein: said timing sequence generator includes a shift register, an oscillator connected to said shift register and, a shift register control connected between said shift register and said first unit, said shift register, said oscillator, and said shift register control operated in response to said mode signals from said first unit to generate said predetermined series of timing signals.

5. A converter, as claimed in claim 4 wherein: said shift register control includes a latch having a data input and a clock input both inputs connected to said first unit and an output connected to a date input of said shift register, said shift register control further including an inverter connected between an output of said shift register and a reset input of said latch, said latch responsive to a write strobe signal on said clock input coincident with a write mode signal on said data input to initiate a counting cycle of said timing sequence generator.

6. A converter, as claimed in claim 4 wherein: said timing sequence generator includes a timing decode means connected between a predetermined group of outputs of said shift register, and said write control.

7. A converter, as claimed in claim 2 wherein: said multiplex control includes a two bit binary counter connected between said write multiplex and said first unit, said counter operated in response to said mode signals from said first unit to extend for each such occurrence a different one of said predetermined gating signals to said multiplex.

8. A converter, as claimed in claim 1 wherein: said write register includes a first portion and a second portion, both said register portions including a plurality of inputs connected to said first unit, and said register control includes a first portion control connected to said write register first portion and a second portion control connected to said write register second portion, both said portion controls connected to said first unit, and operated in response to predetermined ones of said mode signals from said first unit to extend a corresponding one of said store signals to corresponding portions of said write register, said write register first and second portions each responsive to said corresponding store signals to accept data in said first length word format from said first unit.

9. A converter, as claimed in claim 8 wherein: said write register portions each includes a plurality of outputs, said buffer means includes a write multiplex including a plurality of outputs connected to said second unit and including a plurality of input groups each group connected to a different predetermined grouping of said write register outputs, and said buffer control includes a timing sequence generator connected to said first unit and a multiplex control connected between said timing sequence generator and said write multiplex, said timing sequence generator responsive to receipt of said mode signals from said first unit to generate a predetermined sequence of timing signals and to extend a predetermined one of said timing signals to said timing signals to said multiplex control, said multiplex control operated in response to said timing signal to extend a multiplex address to said write multiplex, said multiplex responsive to said multiplex address to gate a predetermined one of said input groups to said second unit.

10. A word length converter for use in transferring data in a word format of a first length to a first data processing unit from a second data processing unit utilizing a word format of a second length, said converter including,
  a buffer means connected between said first and said second units, and including,
    a read register including a plurality of inputs connected to said second unit, and
  a converter control, said converter control comprising:
  a buffer control connected between said first unit and said buffer means and including,
    a read register control connected between said first unit and said read register; and
  a read control connected to said read register control, said buffer control and said second unit, said buffer control in response to receipt of a plurality of mode signals from said first unit, generating a plurality of first control signals to operate said buffer means to transmit said data in said first length word format to said first unit, said read control operated in response to receipt of a plurality of second control signals from said buffer control to extend a plurality of command signals to said second unit to operate said second unit to transmit said data in said second length word format to said read register inputs, said read register control responsive to said mode signals from said first unit and a plurality of third control signals from said read control to extend a plurality of store signals to said read register, said read register operated in response to said store signals to accept said data from said second unit and, said read control further operated to extend said plurality of third control signals to said read register control for use in operating said read register.

11. A converter, as claimed in claim 10 wherein: said read register includes a first and a second portion both said register portions including a plurality of inputs connected to said second unit, and said register control includes a first portion control connected to said read register first portion and a second portion control connected to said read register second portion, both said portion controls connected to said first unit and operated in response to predetermined ones of said mode signals from said first unit to extend a corresponsing one of said store signals to corresponding portions of said read register, said read register first and second portions each responsive to said corresponding store signals to accept data from said second unit.

12. A converter, as claimed in claim 11 wherein: said read register portions each include a plurality of outputs said buffer means includes a read multiplex including a plurality of outputs connected to said first unit and including a plurality of input groups, each group connected to a different predetermined grouping of said read register outputs, and said buffer control includes a timing sequence generator connected to said first unit and a multiplex control connected between said timing sequence generator and said read multiplex, said timing sequence generator responsive to receipt of said mode signals from said first unit to generate a predetrmined sequence of timing signals and to extend a predetermined one of said timing signals to said multiplex control, said multiplex control multiplex control operated in response to said timing signal to extend a multiplex address to said multiplex, said multiplex responsive to a said multiplex address to gate predetermined one of said multiplex input groups to said first unit.

13. A bidirectional word length converter for use in transferring data between a first data processing unit ulitizing a word format of a first length and a second data processing unit utilizing a word format of a second length, said converter including,
  a buffer means connected between said second and said first units, and
  a converter control, said converter control comprising:
  a buffer control connected between said first unit and said buffer means, said buffer control in response to receipt of a plurality of mode signals from said first unit, generating a plurality of first control signals to operate said buffer means to accept data in said first length word format from said first unit and transmit said data in said second length word format to said second unit;
  a second unit control connected between said buffer control and said second unit, said second unit control operated in response to receipt of a plurality of second control signals from said buffer control to extend a plurality of command signals to said second unit to operate said second unit to accept said data in said second length word format; and in the alternative said buffer control in response to receipt of a plurality of alternative mode signals from said first unit, generating an alternative plurality of second control signals to said second unit said second unit control operated in response to receipt of an alternative plurality of second control signals from said buffer control to extend an alternative plurality of command signals to said second unit to operate said second unit to transmit said data in said second length word format to said buffer means and to extend a plurality of third control signals to said buffer control, said buffer control further operated in the alternative in response to receipt of said plurality of alternative mode signals from said first unit and said plurality of third control signals from said second unit control, generating an alternative plurality of first control signals to operate said buffer means to accept data in said second length word format from said second unit and transmit said data in said first length word format to said first unit.

14. A converter, as claimed in claim 13 wherein: said second unit control includes a write control and a read control, said controls each connected between said buffer control and said second unit.

15. A converter, as claimed in claim 13 wherein: said buffer means includes a write buffer and a read buffer.

16. A converter, as claimed in claim 15 wherein: said write buffer includes a write register including a plurality of inputs connected to said first unit and including a plurality of outputs, and a write multiplex including a plurality of input groups, each group connected to a predetermined different portion of said write register outputs, said write multiplex including a plurality of outputs connected to said second unit; and said read buffer includes a read register includes a plurality of inputs connected to said second unit and including a plurality of outputs, and a read multiplex including a plurality of input groups, each group connected to a predetermined different portion of said read register outputs, said read multiplex including a plurality of outputs connected to said first unit; and said buffer control includes a timing sequence generator connected to said first unit and and said second unit control, responsive to receipt of a plurality of mode signals from said first unit to generate a plurality of timing signals, and a multiplex control connected to said timing sequence generator and to both said multiplexes, said multiplex control initially generating a first gating signal said multiplex control responsive to a predetermined one of said timing signals to extend a predetermined sequence of gating signals to both said multiplexes; both to said mulitplexes responsive to said gating signals to enable different ones of said multiplex input groups.

17. A converter, as claimed in claim 16 wherein: said register control includes a write register control connected to said write register, to said timing sequence generator, and to said multiplex control, and a read register control connected to said read register, to said multiplex control, and to said second unit control.

18. A unidirectional word length converter for use in transferring data originating in a word format of a first length from a first data processing unit to a second data processing unit utilizing a word format of a second length, said converter including, a register connected to said first unit, including a plurality of outputs, and including at least a first and a second portion, a multiplexer including a plurality of input groups each group connected to a predetermined different portion of said register outputs, said multiplexer connected to said second unit, and a converter control, said converter control comprising:

a timing sequence generator connected to sive to said predetermined ones of said gating signals coincident with said write signal and with said fourth timing signal to extend a write request strobe signal to said second unit;

whereby, said data is stored in said register first and second portions, and in response to receipt by said multiplexer of predetermined ones of said gating signals said data is extended via said register outputs through a corresponding one of said multiplex input groups to said second unit, and further in response to receipt by said second unit of said write request signal and said write request strobe signal, said second unit is operated to accept said data.

19. A unidirectional word length converter for use in tranferring data in a word format of a first length to a first data processing unit from a second data processing unit, utilizing a word format of a second length, said converter including, a register connected to said second unit, including a plurality of outputs, and including at least a first and second portion, a multiplexer including a plurality of input groups each connected to a predetermined different portion of said register outputs, said multiplexer connected to said first unit, and a converter control, said converter control comprising:

a timing sequence generator connected to said first unit, responsive to receipt of each of a plurality of read strobe signals each coincident with a read signal from said first unit to generate a first, a second, a third, and a fourth timing signal;

a multiplex control connected to said timing sequence generator and to said multiplexer, said multiplex control initially generating a first gating signal, said multiplex control responsive to each occurrence of said first timing signal to generate a different one of a plurality of gating signals, each of said gating signals extended to said multiplexer to enable a different one of said multiplexer input groups;

a read control connected to said first and second units, to said timing sequence generator, and to said multiplex control, said read control responsive to predetermined other ones of said gating signals coincident with said read signal and with said third timing signal to extend a read request signal to said second unit;

a register control connected to said register to said multiplex control, and to said read control, said read control further responsive to said predetermined other ones of said gating signals coincident with said read signal and with said fourth timing signal to extend a read request strobe signal to said register control, said register control responsive to predetermined ones of said gating signals coincident with said read request strobe signal to extend a store signal to said register first portion, and said register control further responsive to other ones of said gating signals coincident with said read request strobe signal to extend a store signal to said register second portion, said register operated responsive to said register first portion store signal to store a data word from said second unit in said register first portion and said register further operated responsive to said register second portion store signal to store another data word from said second unit in said register second portion;

whereby, said data is stored in said register first and second portions, and in response to receipt by said multiplexer of predetermined ones of said gating signals, said data is extended via said register outputs through corresponding ones of said multiplex input groups to said first unit.

20. A bidirectional word length converter for use in transferring data between a first data processing unit employing a first word format and a second data processing unit employing a second word format, said converter including, a write register connected to said first unit, including a plurality of outputs and at least a first and a second portion, a write multiplexer including a plurality of input groups each connected to a predetemined different portion of said write register outputs, said write multiplexer connected to said second unit, a read register connected to said second unit, including a plurality of outputs and at least a first and a second portion, a read multiplexer including a plurality of input groups connected to a predetermined different portion of said read register outputs, said read multiplexer connected to said first unit, and a converter control, said converter control comprising:

a timing sequence generator connected to said first unit, responsive to receipt of each of a plurality of write strobe signals each coincident with a write signal, from said first unit and in the alternative responsive to receipt of each of a plurality of read strobe signals each coincident with a read signal, from said first unit to generate a first, a second, a third and a fourth timing signal;

a multiplex control connected to said timing sequence generator and to both of said multiplexers, said mulitplex control initially generating a first gating signal, said multiplex control responsive to each occurrance of said first timing signal to generate a different one of a plurality of gating signals, said gating signals extended to both said multiplexers to enable different ones of said multiplexer input groups;

a write register control connected to said write register, to said multiplex control, and to said timing sequence generator, said write register control responsive to predetermined ones of said gating signals coincident with said second timing signal to generate a write register first portion store signal, and said write register control further responsive to predetermined other ones of said gating signals coincident with said second timing signal to generate a write register second portion store signal, said write register operated responsive to said write register first portion store signal to store a data word from said first unit in said write register first portion and said write register further operated responsive to said write register second portion store signal to store another data word from said first unit in said write register second portion;

a write control connected to said first and second units, to said timing sequence generator, and to said write multiplex control, said write control responsive to each of a first predetermined ones of said gating signals coincident with said write signal and with said third timing signal to extend a write request signal to said second unit, said write control further responsive to said predetermined ones of said gating signals coincident with said write signal and with said fourth timing signal to extend a write request strobe signal to said second unit;

a read control connected to said first and second units, to said timing sequence generator, and to said read multiplex control, said read control responsive to predetermined other ones of said gating signals coincident with said read signal and with said third timing signal to exten a read request signal to said second unit;

a read register control connected to said read register, to said multiplex control and to said read control, said read control further responsive to said predetermined other ones of said gating signals coincident with said read signal and with said fourth timing signal to extend a read request strobe signal to said read register control, said read register control responsive to predetermined ones of said gating signals coincident with said read request strobe signal to extend a store signal to said read register first portion, and said read register control further responsive to other ones of said gating signals coincident with said read request strobe signals to extend a store signal to said read register second portion, said read register operated responsive to said read register first portion store signal to store data word from said second unit in said read register first portion and said read register second portion store signal to store another data word from said second unit in said read register second portion;

whereby, said data is stored in said write register first and second portions, and in response to receipt by said write multiplexer of predetermined ones of said gating signals said data is extended via said write register outputs through a corresponding one of said write mulitplex input groups to said second unit, and further in response to receipt by said second unit of said write request signal and said write request strobe signal, said second unit is operated to accept said data; and in the alternative, said data is stored in said read register first and second portions, and in response to receipt by said read multiplexer of predetermined ones of said gating signals, said data is extended via said read register outputs through corresponding ones of said read multiplex input groups to said first unit.

* * * * *